June 20, 1944.  H. J. SAUER  2,351,880
THERMOMETER MOUNTING FOR REAR-VISION AUTOMOBILE MIRRORS
Filed Feb. 9, 1942
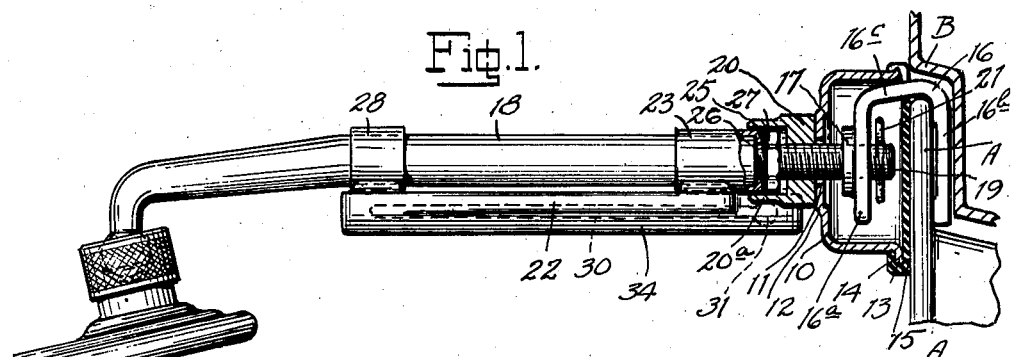
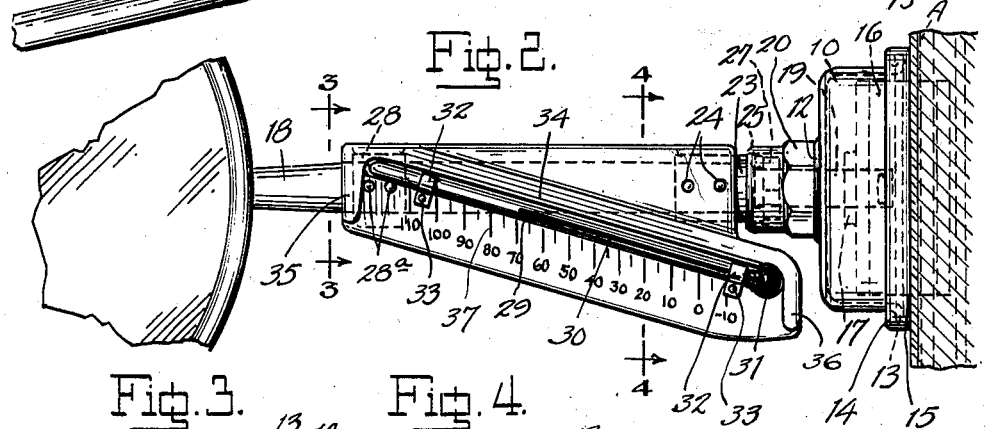
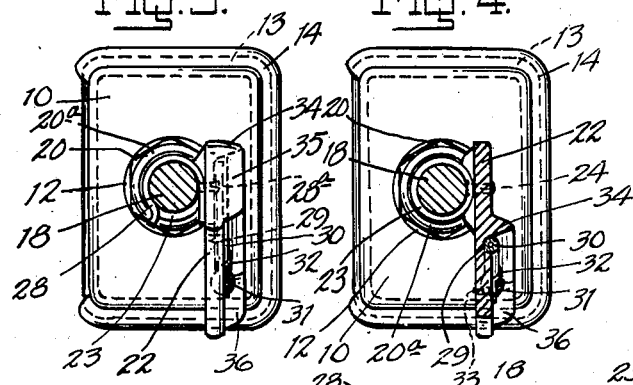
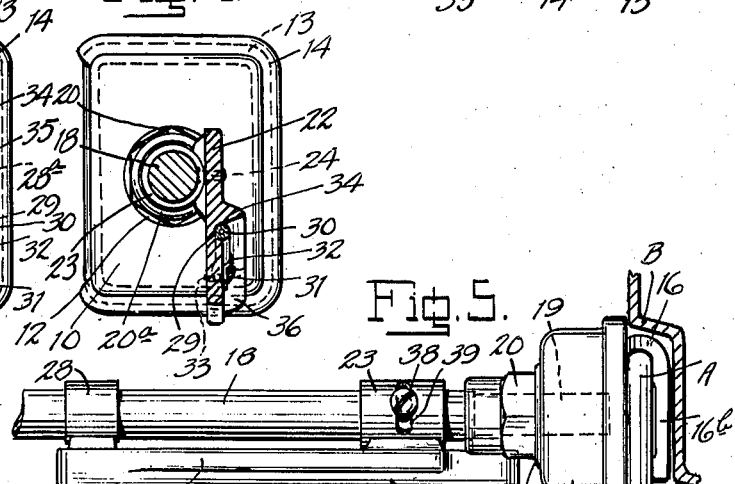
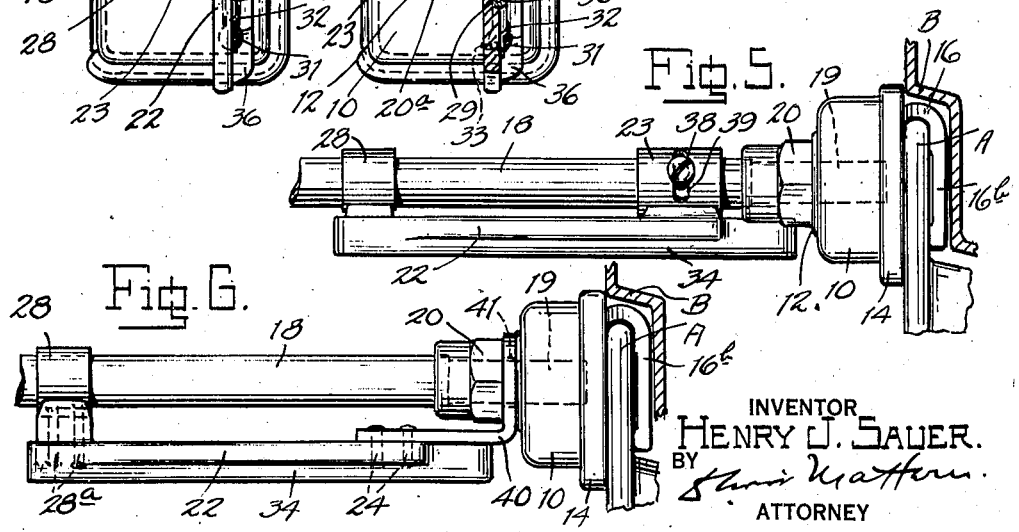
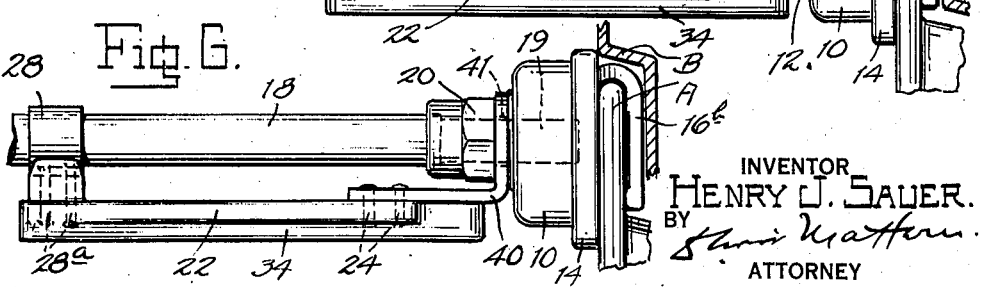
INVENTOR
HENRY J. SAUER.
BY
ATTORNEY Patented June 20, 1944

2,351,880

UNITED STATES PATENT OFFICE 2,351,880

THERMOMETER MOUNTING FOR REAR-VISION AUTOMOBILE MIRRORS

Henry J. Sauer, Fairfield, Conn., assignor to The Kilborn-Sauer Company, Fairfield, Conn., a corporation of Connecticut Application February 9, 1942, Serial No. 430,020

4 Claims. (Cl. 73—348)

The present invention relates to an improvement in thermometer mounting for rear-vision automobile mirrors, and has for an object to provide a device of this character, adapted to be connected to the bracket supporting arm of a rear-vision automobile mirror in such manner that the thermometer may be conveniently read by the driver of the automobile, and may be readily adjusted to dispose the angularity of the thermometer face in direct line with the line of vision of the driver.

A further object is to provide a thermometer mounting which is theft-proof, and to this end it is proposed to provide connection means between the mounting and the mirror-supporting arm of a theft-proof type of rear-vision mirror bracket, the arrangement being such that the thermometer cannot be removed without first removing the mirror bracket. A bracket of this type is disclosed for instance in my co-pending patent application Ser. No. 324,937, filed March 20, 1940, for Rear-vision mirror bracket, this bracket being adapted to be mounted in clamping relation upon the forwardly disposed flange of an automobile door with a portion of the clamping means disposed in the space between the edge of the flange and the opposed frame portion of the door, the frame portion being thus arranged to block the removal of the clamping means from the flange in the closed position of the door.

A further object is to provide a thermometer mounting for a tubular type of thermometer having a column of mercury or other suitable fluid therein, and to mount such tube in an inclined relation between horizontal and vertical, whereby such mounting will not obstruct the vision of the driver, and at the same time the tube will be in a position whereby the combined effect of gravity and the vibration of the automobile will cause the column of mercury or other fluid to flow toward the downwardly disposed bulb end of the thermometer.

A further object is to provide a thermometer mounting which will protect the thermometer against accumulation of snow and rain, as well as against contact with other objects which might break the tube, and further to provide such a mounting which may be readily kept clean.

With the above and other objects in view, embodiments of the invention are shown in the accompanying drawings, and these embodiments will be hereinafter more fully described with reference thereto, and the invention will be finally pointed out in the claims.

In the drawing—

Fig. 1 is a plan view showing the thermometer mounting, according to an exemplary illustrated embodiment of the invention, secured upon a rear-vision mirror bracket, portions of the bracket being shown in horizontal section.

Fig. 2 is an elevation, as seen looking forwardly in the general direction of the driver's line of vision.

Fig. 3 is a vertical sectional view, taken along the line 3—3 of Fig. 2.

Fig. 4 is a vertical sectional view, taken along the line 4—4 of Fig. 2.

Fig. 5 is a plan view of a modified form of the invention.

Fig. 6 is a plan view of another modified form of the invention.

Similar reference characters indicate corresponding parts throughout the several figures of the drawing.

Referring to the drawing, and more particularly to Figs. 1 to 4 thereof, the rear-vision mirror bracket, according to the exemplary illustrated embodiment of the invention shown therein, is substantially like that illustrated in my co-pending application Ser. No. 324,937 referred to above. This bracket comprises an outer clamping cover member 10, in the form of a rectangular box, preferably pressed from sheet metal, having in its outer wall portion an apperture 11, surrounded by an annular outward embossing 12, forming a projecting nut bearing platform at the outer side, for engagement by the securing nut, presently to be more fully referred to, and provided along its inner edge with an outwardly projecting flange 13 extending along the top and bottom and the vertical rearwardly disposed side-wall portions, and which is adapted to engage within the grooved bead edge 14 extending along three sides of a rectangular protective pad member 15, formed of rubber or the like, and which is adapted to engage the outer surface of the flange A of the door.

Within the clamping cover member there is provided a clamping hook member 16, including a leg portion 16$^a$ provided with a threaded hub 17 enclosed within the cover member, a leg portion 16$^b$ arranged to engage the inner surface of the flange A, and an intermediate connecting portion 16$^c$ arranged to extend around the edge of the door flange in the space between the edge of the door flange and the portion B of the door frame, which is opposed to the flange A in the closed position of the door as illustrated in Fig. 1.

The mirror supporting bracket arm 18 is provided at its inner end with a reduced diameter screw threaded portion 19 upon which is engaged a sleeved nut 20, adapted to bear upon the projected annular bearing surface 12 of the clamping cover member, the inner end of the threaded portion being loosely engaged through the aperture 11 and screwed into the threaded hub portion 17 of the clamping hook member. A cotter pin 21 is engaged through the end of the threaded portion 19 of the bracket arm inwardly of the leg portion 16ª of the clamping hook member, and in the operative position prevents removal of the bracket arm from the clamping hook member by outward unscrewing action thereon. In the normal operation of this type of bracket it is engaged with the door flange by loosening the nut 20 to allow the portion 16ᵇ of the clamping hook member to be opened or spread away from the clamping cover member, being then engaged with the door flange A and secured by tightening the nut, the clamping hook member being drawn tightly against the inner surface of the flange and the clamping cover member being pressed tightly against the outer surface of the automobile door. In the closed position of the door as shown in Fig. 1 it is impossible to remove the bracket therefrom, even if the nut 20 is loosened or turning movement is applied to the bracket arm 18, as the opposed frame portion B will prevent disengaging movement of the clamping hook member from the flange. Also the arrangement is such that the nut 20 cannot be loosened sufficiently to open the clamping cover member to permit access to the cotter pin 21, and as this cannot be removed it is impossible to unscrew the bracket arm 18 from the rest of the assembly. Consequently, the rear-vision mirror bracket of this type is effectually theft-proof.

According to the invention, it is proposed to so incorporate the thermometer mounting with the mirror bracket that the thermometer mounting cannot be removed as long as the mirror bracket cannot be removed. The thermometer mounting comprises a thermometer tube supporting frame member 22, which may be of any suitable shape and material to carry out the purpose of the invention, and as illustrated is preferably in the form of a moulded plastic piece or a cast metal piece. This supporting frame member is adapted to be secured longitudinally of the bracket arm 18 and preferably at the rearward side thereof, and for this purpose is provided at its inner end with a cylindrical tubular thimble sleeve member 23 non-removably secured thereto by rivets or the like 24 and which is circumferentially continuous or unbroken so that it cannot be opened up. This thimble sleeve member is engaged over the inner end of the bracket arm 18 prior to assembly of the mirror bracket parts, and is provided at its inner end with an inwardly bent lip flange 25 which abuts the shoulder 26 of the bracket arm 18 adjacent the threaded end portion 19, a nut 27 being engaged upon the threaded end portion 19 for clamping the flange 25 against the shoulder 26, to thus rigidly fix the thimble sleeve to the bracket arm while permitting it to be angularly adjusted to dispose the frame member 22 at the desired angle with respect to the driver's line of vision. The nut 27 and the adjacent flanged end 25 of the thimble sleeve are normally enclosed within the sleeve portion 20ª of the nut 20, the relative spacing of the nut, the clamping cover member, and the clamping hook member with respect to the length of the threaded portion 19 being such that in the loosened relation of the bracket the nut 20 can be backed off sufficiently to expose the nut 27 to permit it to be loosened or tightened by means of a suitable wrench.

At the other end of the frame member 22 there is provided a spring clamp hook member 28, secured by rivets 28ª, and which is adapted to be clamped upon the arm 18 in outwardly spaced relation to the thimble sleeve 23.

The frame member 22 is provided upon its face with a thermometer tube receiving recess 29 inclined downwardly from its outer to its inner end, and adapted to receive the thermometer tube 30 with its bulb 31 disposed at the lower end, the tube being held in place by means of suitable clip members 32—32 secured by rivets 33 to the frame member. Above the recess 30 there is provided a projecting hood portion 34 extending over the thermometer tube along its full length to the ends of the tube where it connects with end wall portions 35 and 36 extending about the ends of the tube to provide protection for it. The hood portion is preferably bevelled at its undersurface, so that it will not obstruct the driver's view of the thermometer tube in any position of angular adjustment at which the driver places the supporting frame, the projection of the hood being sufficient however to effectually protect the tube against the accumulation of snow and water. The supporting frame is provided along its surface beneath the groove 30 with calibrations 37 for indicating the temperature reading.

It will be observed that the tube is so mounted upon the mirror bracket that it does not obstruct the vision of the driver. At the same time, it is so disposed in inclined position that the column of mercury or other fluid therein will be maintained in its proper position within the tube through the action of gravity in combination with the vibration caused by movement of the automobile.

In Fig. 5 I have illustrated a modification of the invention wherein the end flange 25 of the thimble sleeve member 23, employed in the modification Figs. 1 to 4, is dispensed with, the sleeve member being engaged with the bracket arm 18 outwardly of the threaded end portion 19, and being secured against relative angular and longitudinal movement by means of a set-screw 38 screwed into the arm 18 and engaged in a slot 39 in the sleeve member, this slot permitting angular adjustment of the thermometer supporting member to any desired position to accommodate the line of vision of the driver. Like the form of the invention illustrated in Figs. 1 to 4, this is also theft-proof, as the sleeve can only be removed by disengaging it over the threaded end of the bracket arm 18.

In Fig. 6 I have shown a further modification, in which the sleeve member 23 employed in the other embodiments is replaced by an angular attaching bracket 40 secured at its base portion by the rivets 24 to the frame member 22 and provided in its projecting portion with an aperture 41. This angular bracket is engaged upon the threaded end 19 of the bracket arm 18 beneath the nut 20, being adjustably secured against angular movement by clamping action of the nut as the latter is tightened to secure the rear-vision mirror assembly to the automobile door flange. Like the other modifications of the invention, this form of the device is theft-proof, and the supporting frame member 22 may be angularly adjusted to any desired position to accommodate the line of vision of the driver.

I have illustrated and described preferred and satisfactory embodiments of the invention, but it will be understood that changes may be made therein, within the spirit and scope thereof as defined in the appended claims.

Having thus described my invention what I claim and desire to secure by Letters Patent is:

1. A thermometer mounting comprising a substantially laterally extending arm, a thermometer supporting frame member, means carried by said frame member adapted at its forward side to be engaged with said arm whereby said frame member is disposed rearwardly of said arm, a thermometer tube element carried by said frame member upon its rearwardly disposed side and arranged in a substantially lateral direction approximating the lateral direction of said arm, and hood means carried by said frame member and projecting rearwardly over said tube member.

2. A thermometer mounting for automobiles comprising a substantially laterally extending bracket arm and attaching means adapted to secure the bracket arm to an automobile door in theft-proof relation including a reduced diameter threaded end portion and a shoulder portion, a thermometer carrying frame member, and attaching means secured to said frame member and engageable over said bracket arm, said attaching means being in the form of a continuously unbroken circumferential sleeve member adapted to extend around said bracket arm and engageable therewith over an end thereof whereby in an attached relation of said frame member it is removable only over an end of said bracket arm, a flange carried by said sleeve member adapted to engage with said shoulder portion of said bracket arm, and a nut adapted to engage upon said threaded end to tighten said sleeve flange against said shoulder portion.

3. A thermometer mounting for automobiles comprising a substantially laterally extending bracket arm and attaching means adapted to secure the bracket arm to an automobile door in theft-proof relation including a threaded end portion, a nut engaged thereon, and a clamping member opposed to said nut, a thermometer carrying frame member, and an attaching bracket member secured to said frame member having an apertured portion engageable over said threaded portion of said bracket arm between said nut and said clamping member.

4. In combination, a bracket including clamping means for clamping engagement with the forward flange of an automobile door, said door having a frame portion opposed to said flange whereby said clamping means is non-removable from said flange in the closed position of the door, a substantially laterally extending bracket arm connected to said clamping means and being non-removable therefrom in the closed position of the door, and a thermometer mounting comprising a thermometer carrying frame member, attaching means consisting of a continuously unbroken circumferential member rotatably engaged about said bracket arm for angular adjustment and longitudinally opposed by said clamping means whereby it is non-removable from said bracket arm in the closed position of the door, and securing means cooperating between said bracket and said attaching means adapted to secure said frame member in positions of angular adjustment.

HENRY J. SAUER.